United States Patent [19]
Delalande et al.

[11] Patent Number: 5,268,822
[45] Date of Patent: Dec. 7, 1993

[54] LEAD FRAME FOR ANODES OF ELECTROLYTIC CAPACITORS AND PROCESS OF MANUFACTURE OF ELECTROLYTIC CAPACITORS USING SUCH A LEAD FRAME

[75] Inventors: Francois Delalande, Pierre de Bresse; Patrice Besnard, Dijon, both of France

[73] Assignee: Compagnie Europeenne de Composants Electroniques LCC, Courbevoie, France

[21] Appl. No.: 847,064
[22] PCT Filed: Aug. 2, 1991
[86] PCT No.: PCT/FR91/00644
  § 371 Date: Apr. 6, 1992
  § 102(e) Date: Apr. 6, 1992
[87] PCT Pub. No.: WO92/02943
  PCT Pub. Date: Feb. 20, 1992

[30] Foreign Application Priority Data
Aug. 10, 1990 [FR] France .................. 90 10248

[51] Int. Cl.⁵ .............. H01G 1/005; H01G 1/14; H01G 9/10
[52] U.S. Cl. .................. 361/529; 361/538; 29/25.03
[58] Field of Search ............. 361/508, 510, 528, 540; 29/25.03

[56] References Cited

U.S. PATENT DOCUMENTS

| | | | |
|---|---|---|---|
| 4,483,062 | 11/1984 | Irikura | 29/570 |
| 4,539,623 | 9/1985 | Irikura et al. | 361/540 |
| 5,007,149 | 4/1991 | Schnabel | 29/25.03 |

FOREIGN PATENT DOCUMENTS

2625832 7/1989 France .

Primary Examiner—Bruce A. Reynolds
Assistant Examiner—Michael O. Switzer
Attorney, Agent, or Firm—Roland Plottel

[57] ABSTRACT

The object of the invention is a lead frame for electrolytic capacitor anodes characterized by the fact that it comprises, for each anode to be connected, a tab with near its free end a window, the said window being sufficiently large to stop the rise by capillary action which can occur during manufacture of electrolytic capacitors.

12 Claims, 2 Drawing Sheets

LEAD FRAME FOR ANODES OF ELECTROLYTIC CAPACITORS AND PROCESS OF MANUFACTURE OF ELECTROLYTIC CAPACITORS USING SUCH A LEAD FRAME

BACKGROUND OF THE INVENTION

The present invention concerns the manufacture of electrolytic capacitors, more particularly the lead frames for electrolytic capacitor anodes.

At present, electrolytic capacitors are generally made using an aluminium or tantalum anode and an electrolyte which may be solid or liquid.

A process of manufacture of capacitors with aluminium and with a solid electrolyte comprises several stages, a similar process being usable for capacitors with tantalum and a solid electrolyte. These stages are principally:

- construction of the anode block either by compacting an aluminium wire, or by etching, folding or rolling of a sheet of aluminium, or by sintering;
- soldering of the anode block onto a tab of a lead frame;
- anodization of the aluminium block to form a thin layer of alumina (oxidation);
- formation of the solid electrolyte (impregnation and pyrolysis);
- formation of the cathode (graphitization and/or silvering); and
- molding or potting.

The manufacturing process of these capacitors is rather complicated and the problems presently encountered during the manufacture of electrolytic capacitors are of several types.

The connection of the anode block to the tab of the lead frame, which is performed by soldering, is subject to dimensional constraints to be respected to take into account the different phases of manufacture.

To deposit the electrolyte and then the graphite, the anodized blocks are soaked in different solutions which have good wettability, and it can be observed that the conducting electrolyte and graphite rise by capillary action around the solder. There is therefore a risk of short-circuiting between the non-oxidized anode and the cathode constituted by the electrolyte. This rise by capillarity is not controllable and varies depending on the materials and their surface states.

To prevent such short-circuiting, dimensions are imposed: a minimum height for the oxidation of the tab of the lead frame and a lower minimum height for electrolytic impregnation and graphitization, taking into account the capillary rise. There is therefore an oxidized part of the anode which is not impregnated and which is inactive from a capacitive point of view.

SUMMARY OF THE INVENTION

The present invention proposes a mechanical means to eliminate this capillary effect, while enabling the necessary dimensions to be reduced. By reducing the height of oxidation with respect to that of impregnation and graphitization, it decreases the loss of active volume.

The invention consists of a lead frame for electrolytic capacitor anodes, characterized by the fact that it comprises, for each anode to be connected, a tab with, close to its free end, a means preventing the rise by capillary action, without hindering the soldering of the anode block.

The invention also concerns a process for manufacture of an electrolytic capacitor using such a lead frame.

BRIEF DESCRIPTION OF THE DRAWINGS

The invention will be better understood and other advantages will appear on reading the description of a preferred mode of embodiment, with reference to the appended drawings of which.

DESCRIPTION OF THE PREFERRED EMBODIMENTS

Figure 1:
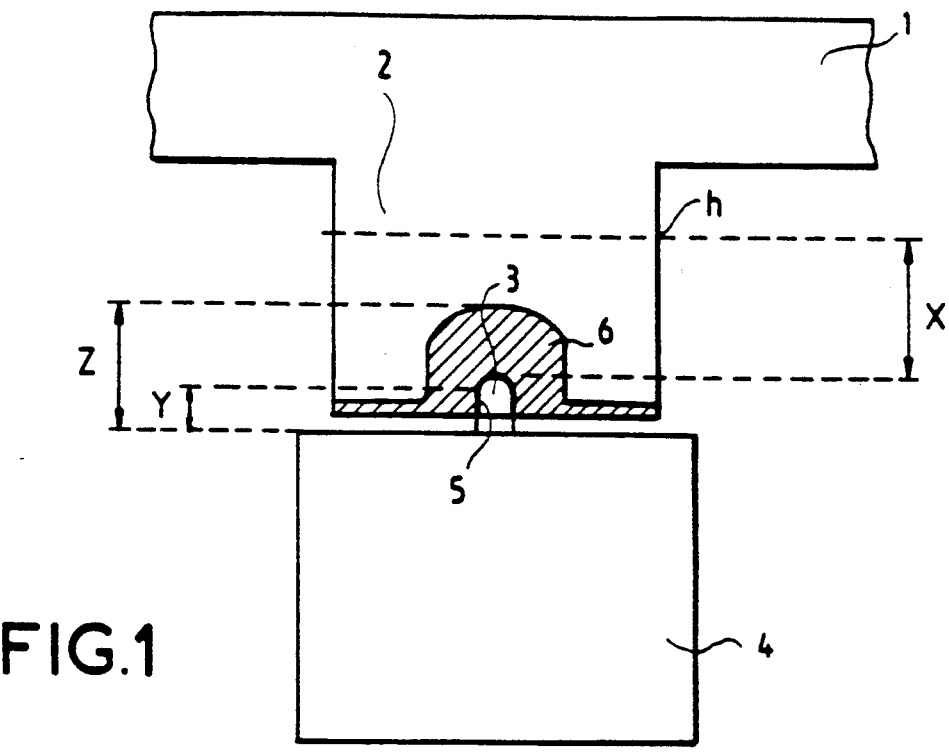
FIG. 1 represents a lead frame for electrolytic capacitors according to the prior art.

FIG. 1 shows part of a lead frame 1. This frame can be made of aluminium or tantalum or any other metal compatible with the anode of the capacitor. It is provided with tabs 2 of the same material. On one of them has been soldered the connecting wire 3 from an anode block 4. This soldering 5 is performed before soaking the anode in the various baths for oxidation of the anode block, then the deposition or impregnation of the electrolyte and finally the graphitization. After soaking in these baths, a rise by capillarity 6 is seen around the solder 5, to a height which is not controllable. If the height Y represents the tolerance for the bath level in the impregnation and graphitization phases, then the height X is the height lost for the active volume of the capacitor. For safety reasons, the oxidation must go up to the limit h on FIG. 1, which for given external dimensions reduces the active volume of the capacitor.

Figure 2:
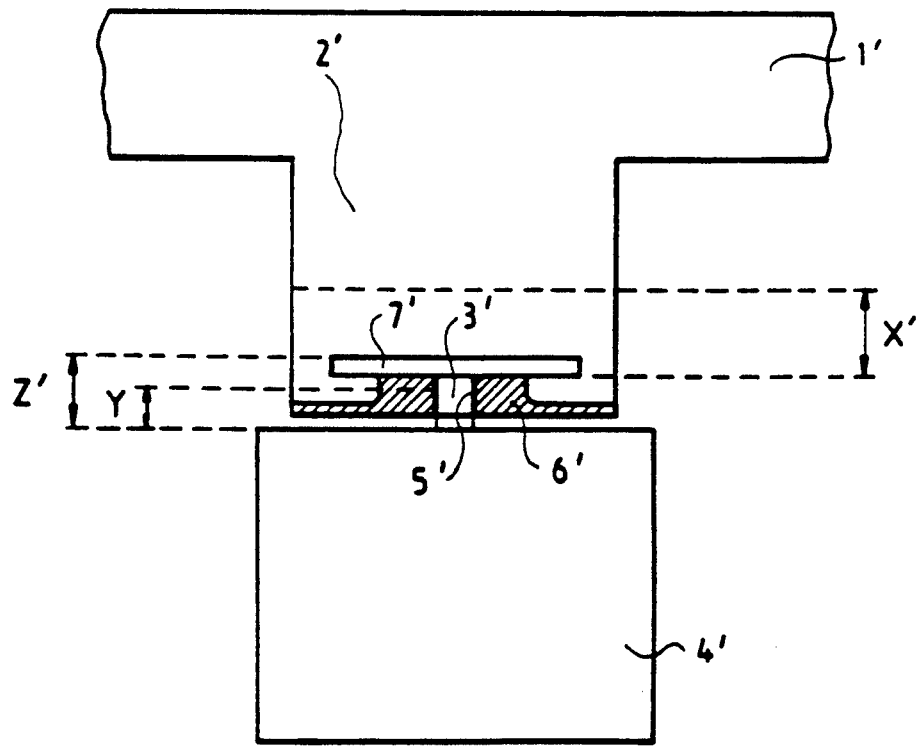
FIG. 2 represents a lead frame for electrolytic capacitors according to the invention.

A mode of embodiment of the present invention is represented in FIG. 2. In this case, the lead frame 1' has been improved over that seen previously. A rectangular window 7' is cut in the tab 2' leaving sufficient space between itself and the edge of the tab 2' to enable soldering 5' of the anode block 4'. The window 7' stops the rise by capillarity 6' and imposes the height Z'. This height Z' is fixed. For this reason, the oxidized level can safely be brought nearer. As a consequence, the distance X' between the soldering and the oxidation level is less than the distance X and has been reduced by the difference between Z and Z'.

The window 7' may be of various shapes. It may be rectangular, round, or of any shape as long as its dimensions are sufficient to form a barrier to the capillary rise, while still leaving a sufficiently solid connection tab. It is preferably at least 0.3 mm thick and its length is preferably 0.5 to 0.7 times the width of the tab.

As an example, a window was made 0.3 mm thick and 1.6 mm wide on a connection tab 2.4 mm wide. This window is 0.3 mm from the free end of the tab. For a connection made by a soldering of dimension 0.3 to 0.4 mm, of a 0.3 mm wire on such a connection tab, wetting is observed over a length of 0.9 to 1.2 mm. This wetting is not controllable and varies depending on the materials and their surface states; but it should be noted that wetting is greater with graphite than with manganese nitrate. The present invention therefore limits the extent of this wetting.

This invention also has other advantages.

The window can also be used as a visual level mark during the various steps in manufacture.

The window 7' enables soldering of the anode block 4' at the very edge of the tab 2' of the lead frame 1', avoiding the waste of a length of inactive anode.

During the final potting phase, the resin used penetrates the window 7' and thus provides better anchorage in the connection tab.

The window 7' may be pierced before or after the soldering 5' of the anode blocks 4' on the tabs 2' of the lead frame 1', and in either case, the window 7' enables excess wire 3' to be cut off above the solder 5'.

Figure 3:
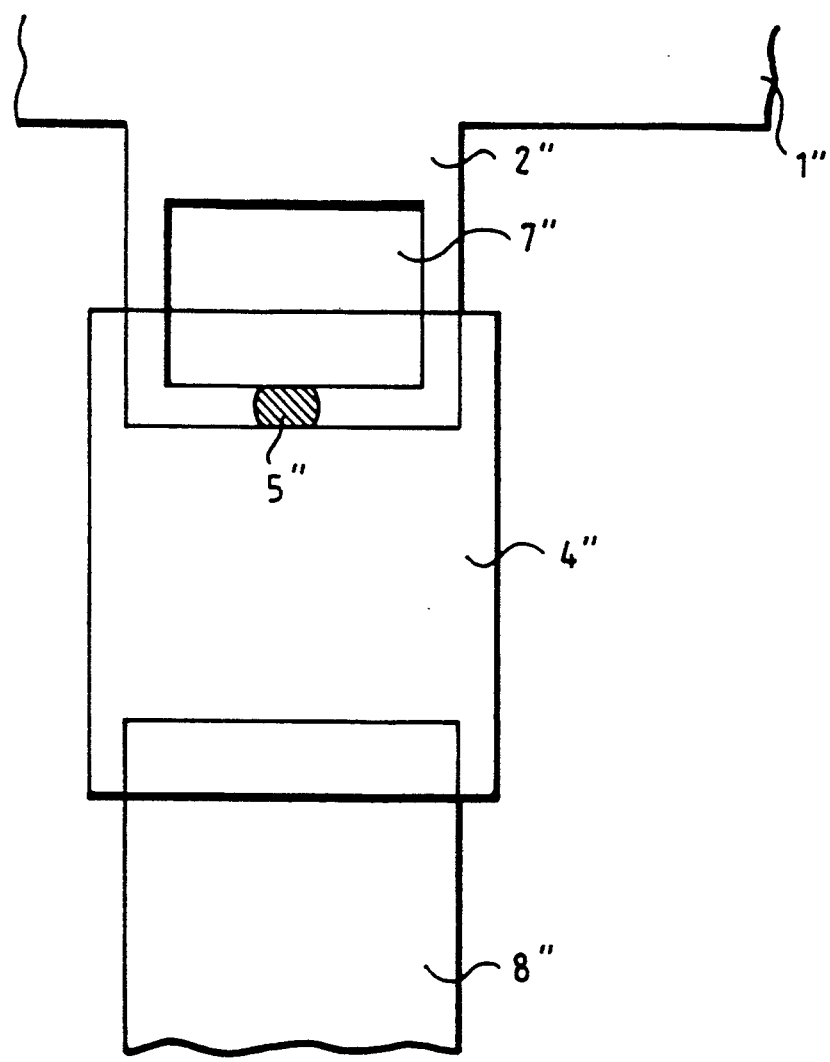
FIG. 3 represents a variant embodiment of the present invention.

According to a variant of the present invention represented in FIG. 3, the window 7" can be relatively thick. In this case, the window serves to identify the anode 2". FIG. 3 then represents part of a lead frame 1" whose tabs 2" are pierced by a window 7" which is thicker than that in FIG. 2. Consequently, once the capacitor 4" is finished, the anode 2" can be distinguished from the cathode 8", thanks to the window 7" which is not completely potted or molded.

What is claimed is:

1. Lead frame for anodes for electrolytic capacitors, said anodes being manufactured by the construction of an anode block either by compacting an aluminum or tantalum wire, or by etching or folding or rolling of a sheet of aluminum or tantalum, or by sintering of a powder of aluminum or tantalum, said lead frame comprising a tab soldered to said anode block, wherein said tab comprises a window which eliminates a conducting electrolyte and graphite rise by capillarity action when said anode block is soaked in baths of deposition or impregnation of the electrolyte and of graphitization.

2. Lead frame according to claim 1, wherein the window is rectangular, square or round.

3. Lead frame according to claim 2, wherein the window has a length of between 0.5 and 0.7 times the width of a tab.

4. Lead frame according to any one of claims 1, 2 or 3, wherein the window is at least 0.3 mm thick.

5. Lead frame according to claim 4, wherein said tab is made of aluminum or tantalum.

6. Process of manufacture of an electrolytic capacitor using a lead frame according to any one of claims 1, 2 or 3, characterized by the following steps:
   i—construction of the anode block either by compacting an aluminium or tantalum wire, or by etching or folding or rolling of a sheet of aluminum or tantalum, or by sintering of a powder of aluminium or tantalum;
   ii—soldering of the anode block to a tab of the lead frame at the edge of the tab;
   iii—anodization of the anode block to form a thin dielectric layer, the window serving as a dimension guide, then in known manner;
   iv—formation of the solid electrolyte;
   v—fitting of the cathode followed by potting or molding.

7. Lead frame according to claim 4 wherein there is a space between said window and the edge of said tab to enable soldering of said anode block.

8. An electrolytic capacitor comprising an anode block (4'); a lead frame (1') having a tab (2') attached by a joint (3') to said anode block before said block is oxidized and impregnated; said tab comprising a window (7') adjacent one end of said joint; and said window having dimensions sufficient to form a barrier to capillary rise during said oxidation and impregnation, and to also permit sufficient mechanical support of said one end of said tab to said joint and said block.

9. A capacitor according to claim 8 wherein said window (7') is in the range of 0.5 to 0.7 times a width of said tab.

10. A capacitor according to claim 9 where said tab is about 2.4 mm wide, and said window is about 1.6 mm wide and about 0.3 mm thick, and about 0.3 mm from a free end of said tab, and said joint (5') is in the range of about 0.3 to 0.4 mm wide.

11. A capacitor according to claim 8 wherein said joint (3') is a soldered joint of a wire.

12. A capacitor according to claim 8 further comprising a potting compound encasing said block and said lead frame tab and penetrating into said window thereby providing better anchorage of the connecting tab to said block.

* * * * *